Figure 1:
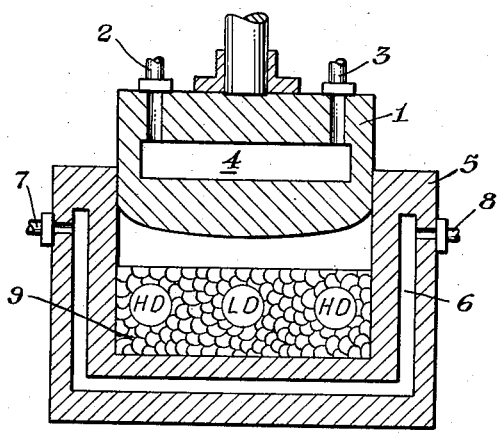

Aug. 18, 1959     W. E. DONALDSON ET AL     2,899,708
MODIFICATION AND CONTROL OF PLASTIC FOAM DENSITY AND
FOAM BODIES OBTAINED THEREBY
Filed June 14, 1954

INVENTORS
Walter E. Donaldson
Alden W. Hanson

BY

Griswold & Burdick
ATTORNEYS

United States Patent Office 2,899,708
Patented Aug. 18, 1959

2,899,708

MODIFICATION AND CONTROL OF PLASTIC FOAM DENSITY AND FOAM BODIES OBTAINED THEREBY

Walter E. Donaldson and Alden W. Hanson, Midland, Mich., assignors to The Dow Chemical Company, Midland, Mich., a corporation of Delaware Application June 14, 1954, Serial No. 436,506

13 Claims. (Cl. 18—48)

This invention concerns a method of treating solid foams of thermoplastic resins to increase, modify, and control, the density thereof without destroying the closed cellular structure of the same. It pertains especially to a method of increasing to a desired extent, and rendering substantially uniform, the density of a foam of a thermoplastic alkenyl aromatic resin. The invention also concerns the solid plastic foams, substantially uniform throughout in density, which are obtainable by the method of the invention.

The solid plastic foams with which the invention is concerned, comprise a mass of individually closed cells having thin walls of a thermoplastic resin. Such plastic foams, and methods of making the same, are well known. They are produced by incorporating throughout a non-cellular body of a thermoplastic resin, a compressed gas, or a volatile liquid, or a thermally-decomposible gas-forming substance, and causing expansion of the gas within the resin while the latter is in a plastic, e.g. heat-plastified, condition. A usual method for producing such a plastic foam is described in greater detail in U.S. Patent No. 2,450,436. Ways are also known for shaping the plastic foams into sheets, planks, etc., during formation of the same. A polystyrene foam, known as Styrofoam, is marketed in sheet form.

The plastic foams prepared by known methods are uniform in appearance, but are non-uniform and irregular in density. A sheet of the foam is often as much as from 10 to 20 percent more dense near the side edges of the same than in a center-section of the sheet. Regardless of its shape, a plastic foam made by the known methods, is usually more dense near its outer surfaces than in the interior of the body of foam. Because of their individually-closed cellular structure and the low thermal conductivity of the cell walls of the same, the solid foams of thermoplastic resins are highly effective as heat-insulating materials. A foam of polystyrene is widely used in the form of panels for the insulation of homes, refrigerators, etc.

For some purposes, it is important that a plastic foam, having individually closed cells, be of a specified and uniform density throughout a body of the same. The plastic foams heretofore available do not meet these requirements.

An object of this invention is to provide a method whereby a plastic foam body of non-uniform and irregular density may be brought to a desired, and preferably a substantially uniform, density greater than its initial average density without destroying the individually closed cells of the same. A further object is to provide such a method for changing the density of a plastic foam, which method permits modification of the foam to introduce desired and predetermined density conditions therein. Another object is to provide plastic foams, especially sheets or panels thereof, which are substantially uniform in density throughout a body of the same. Other objects will be evident from the following description of the invention.

It has been found that a solid foam of a thermoplastic resin, which foam initially is non-uniform in density, can be brought to a condition of uniform density by (1) pressing the same in a confined space between solid surfaces, the foam, or one or both of said solid surfaces being shaped in a manner, relative to the density variations throughout the body of foam, such that upon applying sufficient pressure, the average density of the foam between the pressing members will be the same throughout the area between the pressing members, and applying pressure to accomplish this result; (2) then heating the foam in the confined space sufficiently to plastify the resin constituting the cell walls of the same; and (3) cooling the foam within the confined space to solidify the resin cell walls and thereby render the foam dimensionally stable. It has also been found that the pressure applied can be varied to bring the plastic foam to a predetermined uniform density in a range between the average density initially possessed by the foam and the density of the solid resin of which the cell walls are composed. It has further been found that the method of the invention may be modified to produce desired and predetermined density variations in a plastic foam.

The first of the above steps does not cause permanent destruction of the individually closed cells of the foam. This is surprising, especially with a foam of polystyrene which is known to be more brittle than most other thermoplastic resins when in solid, unstretched form. It is possible that the pressing step (1) may cause temporary breakage, or rupture, of some of the cell walls and that the heat-plastifying step (2) causes reformation of the individually closed foam cells, but it is probable that the cells withstand step (1) without becoming broken or ruptured.

The pressing step (1) can be applied to bring the plastic foam between the pressing members to a uniform average density while under the applied pressure, but it is not effective, of itself, in producing a dimensionally stable plastic foam article of truly uniform density throughout the body of the same. The pressing step (1) would be expected to cause a greater increase in density of the foam in regions adjacent to the pressing members than in the interior of the body of the foam and this presumably occurs.

The heat-plastifying step (2) not only permits plastic flow of the cell walls of the foam, but apparently permits equalization of the gas pressure within the foam, i.e. in the cells of the foam. This, in turn, appears to cause a limited amount of movement and reshaping of the cells. In instances in which step (1) is applied to bring the foam to a uniform average density, the movement and reshaping of the cells during heating step (2) is sufficient to bring the foam to a substantially uniform density throughout the body of the same. The final foam body is of approximately the same density in regions near its outer surfaces as in inner portions of the body. There may, in some instances, be a skin of more dense, e.g. unfoamed or partially foamed, resin at the outer surface of the body, but usually such skin is absent or is very thin, e.g. of less than $\frac{1}{32}$ inch thickness, and is negligible in amount relative to the entire body of foam.

The above-mentioned cooling step (3) solidifies the cell walls of the foam and renders the latter dimensionally stable.

Although the method of the invention can be applied with advantage to render a conventional foam of any thermoplastic resin more nearly uniform in density, regardless of the kind of gas or vapor initially employed in making the foam, or present in the foam cells, the method is most effective when applied to foams which contain gases that do not readily escape, e.g. by diffusion or displacement with air, from the cells of the foam.

Gases such as air, or methyl chloride, diffuse readily and fairly rapidly through the cell walls of a plastic foam, e.g. of polystyrene. On the other hand, gaseous olefines such as ethylene, propylene and butylene, and Freon, $CCl_2F_2$, in particular, do not diffuse readily or rapidly through the cell walls. Foams made with, and containing, the less readily diffusible gases are preferably employed in the method of the invention.

Foams of any thermoplastic resin, e.g. polymethylmethacrylate, polystyrene, or poly-(ar-vinyltoluene), etc., can be treated by the method to render them substantially uniform in density. Foams of the thermoplastic alkenyl aromatic resins, which resins are polymers or copolymers of one or more vinylidene compounds including at least 50 percent by weight of one or more alkenyl aromatic compounds having the general formula

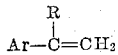

wherein Ar represents an aromatic radical of the benzene series and R represents hydrogen or a methyl radical, are of particular interest as regards the invention. Examples of such thermoplastic alkenyl aromatic resins, which may be employed as foams thereof, are the solid homopolymers of styrene, alpha-methylstyrene, ar-vinyltoluene, and ar-chlorostyrene, solid copolymers of any two or more of these compounds with one another; and solid copolymers of one or more of such monoalkenyl aromatic compounds with a lesser amount by weight of one or more other polymerizable monoolefinic compounds such as methylmethacrylate, ethylacrylate, or isobutylene, etc.

Figure 2:
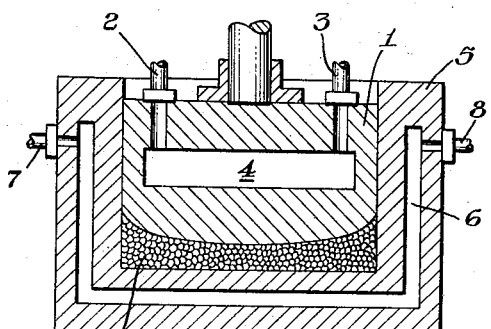
Figure 3:

The accompanying drawing illustrates certain stages in each of two alternative procedures for practice of the invention. Figs. 1–3 illustrate a procedure for production of a plastic foam article of irregular shape, but of substantially uniform density throughout, wherein the contact surface of one of the pressing members is contoured in accordance with the variations in density in a plastic foam body of non-uniform density which is to be treated by the method of the invention. The contours are such that when pressure is applied to bring all of the pressing surfaces in contact with the foam, the average density of the foam between the plunger and its complementary pressing member, e.g. the bottom of a mold, will be approximately the same throughout the area between the pressing members just mentioned. Instead of having only one of these complementary pressing members contoured in accordance with variations in the initial density of the plastic foam to be treated, both of said members may be contoured. The procedure illustrated by Figs. 1–3 is inconvenient because of the difficulty of obtaining suitable contours in the contact surfaces of one or both of a pair of pressing members, but is advantageous in that it permits production of plastic foam bodies of substantially uniform density in the form of articles of desired irregular shapes.

Figure 5:
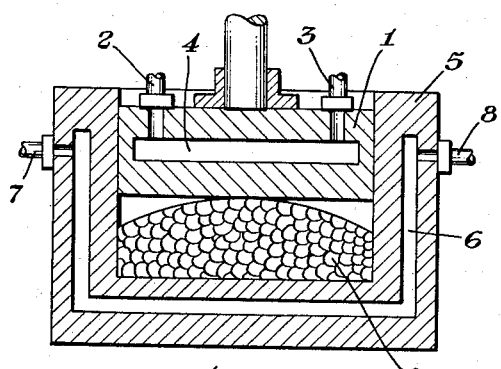
Figure 6:
Figure 4:
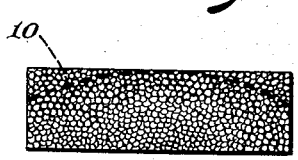

Figs. 4–6 illustrate stages in a more simple and preferred procedure for producing a sheet or panel of a plastic foam which is substantially uniform in density. This procedure involves (1) contouring an outer surface, or opposing outer surfaces, of a plastic foam of non-uniform density in a manner such that upon positioning the foam body with a contoured face thereof at the top or bottom, all vertical sections, having the same horizontal cross sectional area, of the body will contain approximately the same weight of foam, and (2) pressing the foam between solid members having parallel plane surfaces, at least one of which plane surfaces is in contact with a contoured face of the foam.

Regardless of which of the above procedures is employed, the final steps of the process involve heating the compressed foam to render the cell walls thereof plastic and cooling the foam, while confined between the pressing members, to solidify the cell walls and render the body of foam dimensionally stable. The body of foam may then be removed from the mold.

In Fig. 1, the numeral 1 designates a pressing plate, or punch, which is provided with an inlet 2, and outlet 3, connecting with a cavity 4 therein through which a heating or cooling fluid, e.g. steam or water, may be passed. Punch 1 fits inside a mold 5 having walls that are provided with a cavity 6 and with an inlet 7 and outlet 8 for passage of a heating or cooling fluid through the cavity. A sheet 9 of plastic foam of non-uniform density is positioned in the bottom of mold 5. Portions of the sheet of foam are marked as "HD," meaning high density, and "DL," meaning low density, to illustrate certain of the variations in density throughout the sheet. It will be noted that the bottom face of punch 1 is contoured in accordance with the variations in density throughout the sheet of foam.

Fig. 2 shows the punch 1 lowered to compress the foam sheet within the mold 5. The foam is usually compressed at room temperature or thereabout, but this operation may be accomplished at lower or somewhat higher temperatures below the second order transition temperature of the foam. When punch 1 has been lowered to a position such that the upper face of the foam sheet 9 conforms to the bottom surface of the punch, the foam is heated, e.g. by passage of hot water or steam through the punch and mold cavities 4 and 6, sufficiently to render the cell walls of the foam plastic. The temperature to which the foam may be heated, to plastify the walls of the same, vary somewhat depending upon the kind of resin and sometimes to a lesser extent upon the kind of gas, used in making the foam. The temperature to which the foam is heated is at least as high as, and usually not more than 30° C. above, the second order transition temperature, i.e. the heat distortion temperature, of the cell walls of the foam. It usually is from 1° to 30° C. or more higher than said transition temperature. In many instances the second order transition temperature of a plastic foam is substantially the same as that of the resin of which its cell walls are composed. However, gases used in making plastic foams sometimes have a plasticizing action on the cell walls, in which case the second order transition temperature of a foam may be slightly lower than that of the resin alone. In most instances temperatures of from 85° to 115° C. or above can be used to heat-plastify the walls of the foams and temperatures of from 87° to 95° C. are usually preferred, especially with a foam of polystyrene or other of the hereinbefore-mentioned alkenyl aromatic resins. The time of heating should be sufficient to heat-plastify all of the cell walls of the foam, and is dependent on the size and dimensions of the body of compressed foam. In most instances, the foam has been maintained at a heat-plastifying temperature for from 10 to 30 minutes, but longer heating may sometimes be required.

The foam is then cooled to below the second order transition temperature of the resin, preferably to about room temperature, e.g. by passing a cooling fluid such as water through the cavities 4 and 6 of the punch and mold, respectively. The shaped article of plastic foam may then be removed from the mold. Fig. 3 is an end view of an irregular-shaped plastic foam article of substantially uniform density, such as may be produced by the procedure just described. This procedure permits production of plastic foam articles of uniform density in any of the shapes obtainable by means of molds.

Instead of contouring a pressing surface, e.g. of the punch, in a manner such as to produce a plastic foam article of uniform density, the contour may be varied therefrom in a manner such as to cause desired and predetermined density variations in the plastic foam article that is formed. This feature of the invention will be described more fully with respect to Figs. 4–6 wherein a plastic foam body, rather than a pressing member, is contoured.

The procedure illustrated by Figs. 4–6 of the drawing is similar to that just described, except that the plastic foam of non-uniform density is contoured, as hereinbefore described, in accordance with the density variations throughout the same, and is compressed in contact with plane surfaces of a punch 1 and mold 5.

Fig. 4 is an end view of a plastic foam sheet of non-uniform density, which sheet is shown as being marked by a broken line 10 in accordance with the density variations therein. Procedures for determining variations in density throughout a body of material are known to the art. A convenient method is to scan a foam sheet of uniform thickness under exposure to monochromatic light of constant intensity and of a quality partially absorbed or reflected and partially transmitted through the sheet and to measure the variations in intensity of the transmitted light. In Fig. 4, all vertical sections, having the same horizontal area, of the portion of the sheet of foam below the broken line contain the same weight of resin. The portion of the foam sheet above the broken line 10 is removed, e.g. by cutting, and the remainder of the sheet is placed in a mold, as illustrated by Fig. 5, compressed to a desired extent, heated to plastify the cell walls thereof, cooled, and removed from the mold. These heating and cooling operations are carried out in a manner similar to that described with respect to Figs. 1–3 of the drawing. Fig. 6 is an end view of a sheet of plastic foam of uniform density throughout, such as is obtainable by the procedure just described. When such sheet is heated at atmospheric pressure to above the second order transition temperature, it expands. It can be thermally expanded within a mold to obtain a somewhat larger or thicker sheet of substantially uniform density, or to produce in the foam sheet a desired and predetermined variation in density. For instance, the expansion may be of a local section of a sheet to produce a protruding design or other desired contour on an outer surface thereof.

Figure 7:
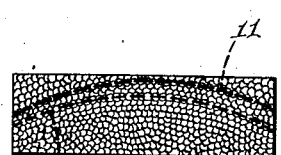

The method can be modified to produce plastic foam bodies having desired variations in density throughout the same, e.g. having a certain section of higher density than the remainder of the body or of progressively increasing density from one edge thereof to the other. Fig. 7 shows a sheet of foam of irregular density, similar to that shown in Fig. 4. The broken line 10 of Fig. 7 outlines a contour such that all vertical sections, having the same horizontal area, of the portion of the sheet below said line contain the same weight of foam. The broken line 11 of Fig. 7 is a cutting line. By removing the portion of the foam sheet above line 11 and treating the remainder of the sheet in the manner described with regard to Figs. 4–6, there is produced a foam sheet somewhat thinner, but otherwise similar in appearance, to that shown in Fig. 6. However, the density of the foam sheet thus obtained increases in a regular manner across the width of the sheet.

Figure 8:
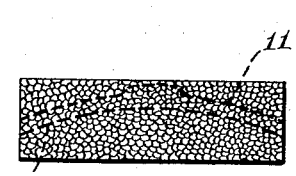

Fig. 8 shows another foam sheet of irregular density, similar to that shown in Fig. 4, which sheet is marked with broken lines 10 and 11. Broken line 10 outlines a contour which varies in accordance with density variations in the sheet in the manner hereinbefore described. The broken line 11 in Fig. 8 is a cutting line. By removing the portion of the foam sheet above the contour indicated by line 11, and subjecting the remainder of the sheet to the operations hereinbefore described with respect to Figs. 4–6, there is obtained a foam sheet which is thinner than, but otherwise similar in appearance to, that shown in Fig. 6. However, the vertical section of the final foam sheet corresponding to the material below the hump in the cutting line of Fig. 8 is of higher density than other portions of the sheet. Most of the remainder of the foam sheet product is of a substantially uniform density, i.e., the density decreases quite rapidly to nearly a constant lower density value near the outer edges of the region of high density.

The following examples describe certain ways in which the invention has been practiced, but are not to be construed as limiting the invention.

Example 1

The plastic foam starting material used in this experiment consisted of planks of a solid foam of polystyrene, which had been prepared by foaming polystyrene with Freon and shaping the foam into planks as it was formed. Each plank had dimensions of 2¼ x 10 x 36 inches and had an average density value of about 4½ pounds per cubic foot. Each plank was examined individually to determine the variations in density throughout the same. It was more dense near outer surfaces of the same than in the interior and the density was greater near the side edges of the plank than in its mid-section. There was an approximately 15 percent variation in density across the width of the plank. One face of each plank was contoured in a manner such that the less dense portions thereof remained of the original thickness and there was, for each square inch of area of the uncontoured face of the plank, the same weight of foam in the thickness of the plank. Four planks were placed in side by side position, within a steel frame, with the contoured face of each up. The planks were compressed to ¾ inch thickness between platens having plane pressing surfaces. The pressure applied was about 400 pounds per square inch. The platens were provided with jackets for heating or cooling the same. The compressed planks of foam were heated to 88° C. by passing hot water through the jackets of the platens for 25 minutes. Cold water from a service water faucet was then passed through the platen jackets for 15 minutes to cool the foam panels thus formed. The latter were removed from the press and examined for density. The planks were not all of exactly the same initial average density. As a consequence, there was a slight density variation in the foam panels near the edges where the planks had contacted one another while being pressed. These slight variations in density extended only about ⅛ inch into such edge portion of a panel. This edge portion was removed by trimming and the remainder of each panel was found to have a substantially uniform density of about 12.5 pounds per cubic foot. As a test for possible variations in density throughout the thickness of the panels thus obtained, ¹⁄₃₂ inch of surface was removed from each of the opposing faces of one of the panels and the density of the remainder of the panel was again determined. Then ³⁄₃₂ inch of surface was removed from each of the opposing faces of the same panel and the density of the remaining portion of the panel was determined. All of the density values thus determined were in a range of from 12.47 to 12.49 pounds per cubic foot. A foam panel prepared as described above was found to be impermeable to water; a fact indicating that the cells thereof are individual, closed cells.

Example 2

Planks of a foam of polystyrene, produced by foaming polystyrene with propylene and shaping the foam into planks, were employed in this experiment. The planks of foam were initially of irregular density and were similar in this respect, and also in size, to those employed in Example 1. One face of each plank was contoured in a manner such that the weight of foam remaining in the thickness of the plank per square inch of area of the uncontoured face of the plank was the same throughout said area. Four contoured planks were positioned side by side within a steel frame and were pressed to ¾ inch thickness, heated to 88° C. in the press, cooled, and removed. The procedure in carrying out these operations was similar to that described in Example 1. The results were similar to those reported in Example 1, i.e. plastic foam panels having a substantially uniform density of about 12.5 pounds per square inch were obtained.

Example 3

The procedure of Example 2 is repeated, except that the foam planks are subjected to a pressure of about 800 pounds per square inch and are heat-plastified and then cooled while confined within the press. Plastic foam panels having a substantially uniform density greater than those obtained in Example 2, e.g. of about 15 pounds per cubic foot, are obtained.

We claim:

1. A method of treating a solid foam of a thermoplastic resin, which foam has individually closed cells, to increase the density thereof which comprises compressing the foam between solid surfaces of a mold to a smaller volume while it is at a temperature below the second order transition temperature of the resin cell walls thereof, heating the compressed foam while confined in a mold to the temperature at least as high as the second order transition temperature, whereby the gas pressure within the foam is substantially equalized throughout the body of the same and the cells of the foam are thereby reshaped, and cooling the foam while confined in the mold.

2. A method, as described in claim 1, wherein a body of plastic foam, which possesses individually closed cells and initially is of irregular density throughout a considerable portion of the body of the same, is compressed in a mold cavity between relatively movable pressing members, at least one of the contacting faces possessed by said body and said pressing members being contoured in a manner such that the average density value of the foam, in the direction of pressing, through the thickness of the foam body between the pressing members is substantially the same throughout the area between the pressing members, heating the compressed foam to at least the second order transition temperature of the resin walls thereof while it is confined in the mold cavity, and cooling the foam to below said temperature while it is confined in the mold cavity.

3. A method, as claimed in claim 2, wherein at least one of the pressing members is contoured in a manner such that, upon compressing the foam to bring the latter into contact with the entire contoured surface of such pressing member, the average density of the plastic foam, in the direction of pressing, through the thickness of the foam body between the pressing members is substantially the same throughout the area between the pressing members.

4. A method, as claimed in claim 2, wherein the plastic foam of irregular density is pressed in a mold cavity between substantially plane surfaces of relatively movable members and, prior to the pressing, at least one outer surface of the foam is contoured in a manner such that the average density of the foam, in the direction of pressing, through the thickness of the foam body between the pressing members is substantially the same throughout the area between the pressing members.

5. A method of modifying a solid foam of a thermoplastic resin, which foam possesses individually closed cells and is of irregular density, throughout a considerable portion of the body of the same to increase the density of portions of the body of foam to a predetermined extent, which method comprises determining the density variations through the thickness of the body of foam from one side of the latter to the other and thereby determining the extent to which the various portions of the foam must be reduced in thickness by compression by pressing said sides of the foam body toward one another in order to eliminate said variations in average density, compressing the plastic foam of irregular density within a mold to reduce the thickness of the various portions of the foam body by amounts such as to bring all portions of the body of foam to desired and predetermined density values between those initially possessed by the respective portions of the foam body and the absolute density of the resin in the cell walls thereof, heating the compressed foam in the mold to a temperature between the second order transition temperature of the cell walls thereof and 30° C. thereabove, and then cooling the foam to below said second order transition temperature while it is confined within the mold.

6. A method, as claimed in claim 5, wherein at least one of a pair of relatively movable members for compressing the foam within the mold has the contact surface thereof contoured in a manner such that, upon compressing the foam to bring the latter into contact with points over the entire contoured surface of such pressing member, the average density of the plastic foam, in the direction of pressing, through the thickness of the foam body between the pressing members is substantially the same throughout the area between the pressing members.

7. A method, as claimed in claim 5, wherein at least one of a pair of pressing members for compressing the foam within the mold has the contact surface thereof contoured in a manner such that, upon compressing the foam to bring the latter into contact with the contoured surface of such pressing member at points over the entire area of the contact surface, the average density of the plastic foam, in the direction of pressing, through the thickness of the foam body between the pressing members is substantially the same throughout the area between the pressing members.

8. A method, as claimed in claim 5, wherein the plastic foam of irregular density is pressed in a mold cavity between substantially plane surfaces of relatively movable members and, prior to the pressing, at least one outer surface of the foam is contoured in a manner such that, upon pressing the foam, the average density of the foam, in the direction of pressing, through the thickness of the foam body between the pressing members varies by only a desired and predetermined extent from being substantially the same throughout the area between the pressing members.

9. A method, as claimed in claim 5, wherein the plastic foam of irregular density is pressed in a mold cavity between substantially plane surfaces of relatively movable pressing members and, prior to the pressing, at least one outer surface of the foam is contoured in a manner such that, upon pressing the foam, the average density of the foam, in the direction of pressing, through the thickness of the foam body between the pressing members is substantially the same throughout the area between the pressing members.

10. A method which comprises reheating a plastic foam body, prepared as described in claim 5 and having individually closed cells, to a temperature between the second order transition temperature of the cell walls thereof and a temperature not more than 30° C. thereabove within a mold, having a volume larger than the volume possessed by the foam body prior to the heating and smaller than that to which the body is capable of expanding upon being heated at atmospheric pressure, whereby the plastic foam body is expanded to fill the mold, and cooling the foam body to below the second order transition temperature of the cell walls thereof while it is confined within the mold.

11. A solid foam of a thermoplastic resin, which foam possesses individually closed cells and is of substantially uniform density throughout the same.

12. A solid foam of an alkenyl aromatic resin, which foam possesses individually closed cells and is of substantially uniform density throughout the same.

13. A solid foam of polystyrene, which foam possesses individually closed cells and is of substantially uniform density throughout the same.

(References on following page)

References Cited in the file of this patent

UNITED STATES PATENTS

| | | | |
|---|---|---|---|
| 2,071,647 | Miller | Feb. 23, 1937 |
| 2,394,122 | Urmston | Feb. 5, 1946 |
| 2,405,345 | Cooper et al. | Aug. 6, 1946 |
| 2,442,940 | Staudinger et al. | June 8, 1948 |
| 2,659,935 | Hammon | Nov. 24, 1953 |
| 2,681,377 | Smithers | June 15, 1954 |
| 2,702,769 | Alderfer | Feb. 22, 1955 |
| 2,722,719 | Altstadter | Nov. 8, 1955 |